UNITED STATES PATENT OFFICE.

ROBERT WAHL, OF EVANSTON, ILLINOIS.

MALTED FOOD AND PROCESS OF PRODUCING THE SAME.

1,410,973.  Specification of Letters Patent.  Patented Mar. 28, 1922.

No Drawing.  Application filed December 10, 1920. Serial No. 429,753.

*To all whom it may concern:*

Be it known that I, ROBERT WAHL, a citizen of the United States, residing at 830 Sheridan Road, Evanston, in the county of Cook and State of Illinois, have invented a new and useful Improvement in Malted Foods and Processes of Producing the Same, of which the following is a specification.

The object of my invention is to provide a food of the kind which is generally characterized in the trade by the name "breakfast-food", by so treating (the treatment involving malting and caramelizing) any suitable cereal, such as wheat, corn, oats, rice, rye, barley and millet, nuts and fruit-stones, such as almonds, Brazil nuts, walnuts, peach and cherry stones, and seeds, such as cottonseed, beans (particularly the soy bean) and peas, as to render the food product highly palatable and to preserve in undestroyed strength the digestive enzymes (diastase and peptase) formed in the malting procedure.

Malting of the grain, legumes, nuts, stones or seeds used for my purpose involves any usual or suitable steeping and germinating procedures. In the subsequent drying of the sprouted material, however, which may be in a kiln, compartment or drum, such temperature and moisture are maintained as to substantially change the starch into maltose, malto-dextrines and dextrines, the heat employed being so regulated as to produce the desired degree of inversion of the starch content to soluble carbohydrates (sugars and dextrines) and that of subsequent caramelization of these carbohydrates. To this end, I heat the green or sprouted malt to a temperature of about 154° F. within a period 6 to 12 hours while supplying a limited amount of aeration to effect partial drying in that time. That temperature is continued until proper conversion has been attained, whereupon it is raised to 180°–212° F., or higher, to effect desired caramelization. In this drying procedure, both the heat and air supply are regulated to achieve the desired degree of starch and albumen inversion by the action of the diastase and peptase content of the material in the presence of moisture in the matter treated. The greater the moisture content, when the temperature of about 150–154° F. is reached, the more complete will be the inversion; and subsequent caramelization at the higher temperature of 180° to 220° F., or more, will proceed the more rapidly and to a greater extent in respect to darkening of color and enhancement of flavor and taste the greater the amount of moisture retained when the temperature has reached 150–154° F. The temperature may thereafter be further raised, even to 180–220° F., for augmenting parching of the product to suit individual tastes.

After the desired degree of caramelization and complete dryness have been effected, the product is freed from the sprouts, as by screening, and is ground to a grist or meal. If the raw material treated has a husk, the malted product should be decorticated before grinding it. The product thus obtained is reduced to edible form by the grinding; but I prefer to extend the process in the following manner:

The resulting grist is mixed with water in quantity sufficient to form a dough, like bread or cake dough. This dough is then baked to impart a degree of caramelization for enhancing the taste and flavor over that of the meal prior to the baking.

The baked product, in agglomerated or caked form, may be prepared for the market in edible food form by grinding, or it may, before being rendered too dry, be flaked or shredded by subjecting it to suitable flaking or shredding procedure such as is commonly used for providing certain breakfast-foods in those forms; or it may be provided for consumption in cake form, thus without grinding or flaking.

It may be mentioned that when a huskless grain, like wheat or rye, is employed for my purpose, the aleurone layer or bran should not be removed, because it affords a valuable nutrient addition to the endosperm part of the food-product, with all the recognized merits of bran as food but with enhancement of the value of the active digestive agencies in the aleurone layer, such as diastase and also proteolytic enzymes, and lactic acid, the latter effecting partial solution of the phosphates which are abundantly contained in the bran.

The finished product should be introduced into packages for the market while warm to avoid absorption of moisture.

My food-product is superior in agreeable flavor and taste, due to the caramelization in malted form; in ready digestibility owing to its ready solubility, and because of its retained nutrient constituents of the matter treated, such as inverted starch, albumenoids, and phosphates and the added effect of the presence of the digestive enzymes (diastase, petase, etc.).

I claim:

1. The process of manufacturing a breakfast-food, comprising treating kiln-dried malt by degerminating and grinding it, adding a liquid to the ground product and kneading it into a dough, dividing the dough into particles and baking the particles to augment caramelization thereof.

2. The process of manufacturing a breakfast-food, comprising treating kiln-dried malt by decorticating and degerminating it, grinding the resultant product, adding a liquid to the ground malt and kneading it into a dough, dividing the dough into particles and baking the particles to augment caramelization thereof.

3. The process of manufacturing a breakfast-food, comprising treating kiln-dried malt by degerminating and grinding it, adding a liquid to the ground product and kneading it into a dough, dividing the dough into particles and subjecting the particles to a drying temperature below 135° F., and baking the dried particles to augment caramelization thereof.

4. The process of manufacturing a breakfast-food comprising treating kiln-dried malt by decorticating and degerminating it and grinding the resultant product, adding a liquid to the ground product and kneading it into a dough, dividing the dough into particles and subjecting the particles to a drying temperature below 135° F., and baking the dried particles to augment caramelization thereof.

5. As a new article of manufacture, a breakfast-food comprising degerminated and ground kiln-dried malt in baked caramel-augmented condition.

6. As a new article of manufacture, a breakfast-food comprising decorticated, degerminated and ground kiln-dried malt in baked caramel-augmented condition.

7. As a new article of manufacture, a breakfast-food comprising degerminated and ground kiln-dried malt in baked caramel-augmented condition and containing the malt enzymes in active condition.

8. As a new article of manufacture, a breakfast-food comprising decorticated, degerminated and ground kiln-dried malt in baked caramel-augmented condition and containing the malt enzymes in active condition.

ROBERT WAHL.